(12) United States Patent
Monson et al.

(10) Patent No.: US 6,386,134 B1
(45) Date of Patent: May 14, 2002

(54) ELASTOMERIC SIX DEGREE OF FREEDOM ISOLATOR

(75) Inventors: Robert James Monson, St. Paul; Wesley Eugene Revely, Apple Valley; Trevor J. McCollough, Minneapolis; Allen L. Arndt, Burnsville, all of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/524,577

(22) Filed: Mar. 13, 2000

(51) Int. Cl.⁷ ............................................ B63B 8/00
(52) U.S. Cl. ............................................ 114/343
(58) Field of Search ............................ 440/52; 114/343, 114/279, 382; 248/610, 611, 613, 634; 267/139, 140, 140.11

(56) References Cited

U.S. PATENT DOCUMENTS

| | | | | |
|---|---|---|---|---|
| 2,147,660 A | * | 2/1939 | Loewus | 248/613 |
| 2,367,830 A | * | 1/1945 | Kubaugh | 267/141.7 |
| 3,658,314 A | * | 4/1972 | Luzsicza | 267/121 |
| 3,721,417 A | * | 3/1973 | Skala et al. | 248/358 R |
| 3,819,167 A | * | 6/1974 | Nakamura et al. | 267/139 |
| 4,109,474 A | * | 8/1978 | Files et al. | 61/48 |
| 4,277,056 A | * | 7/1981 | Ticks | 267/140.11 |
| 4,577,842 A | * | 3/1986 | Shtarkman | 267/140.11 |
| 4,717,130 A | * | 1/1988 | Barkhage | 267/141.11 |
| 4,784,378 A | * | 11/1988 | Ford | 267/219 |
| 4,905,956 A | * | 3/1990 | Zemlicka et al. | 248/562 |
| 5,026,226 A | * | 6/1991 | Hollowell et al. | 405/211 |
| 5,145,039 A | * | 9/1992 | Morikawa et al. | 188/298 |

FOREIGN PATENT DOCUMENTS

| | | | | |
|---|---|---|---|---|
| DE | 3522333 | * | 1/1989 | 267/140.11 |
| DE | 3826302 | * | 2/1989 | 267/140.11 |
| FR | 2500555 | * | 8/1982 | 267/140.11 |
| GB | 692691 | * | 6/1953 | 267/141.3 |
| GB | 2079894 | * | 1/1982 | 267/140.11 |
| JP | 57-4497 | * | 1/1982 | 440/52 |
| JP | 57-58596 | * | 4/1982 | 440/52 |
| JP | 2-38730 | * | 2/1990 | 267/140.11 |
| JP | 2-245536 | * | 8/1990 | 267/140.11 |
| JP | 2-292539 | * | 12/1990 | 267/140.11 |
| JP | 3-79821 | * | 4/1991 | 267/141.3 |
| JP | 5-149368 | * | 6/1993 | 267/140.13 |

* cited by examiner

Primary Examiner—S. Joseph Morano
Assistant Examiner—Ajay Vasudeva
(74) Attorney, Agent, or Firm—Patrick M. Hogan; Glenn W. Bowen

(57) ABSTRACT

A shock isolator having a housing securable to a support structure with the housing containing a bell shaped elastomer having a base secured to the housing and an axially offset apex surface secured to a connector to cantileverly support equipment to be isolated from shock with the cantileverly support of apex surface from the base insuring that any displacement of the connector produces a substantial shearing action in the elastomer to effectively damp the effect of a shock on the shock isolator.

18 Claims, 2 Drawing Sheets

ELASTOMERIC SIX DEGREE OF FREEDOM ISOLATOR

FIELD OF THE INVENTION

This invention relates generally to shock isolators and, more specifically, to a single shock isolator providing damping in three coordinate axis.

BACKGROUND OF THE INVENTION

The concept of shock isolator is old in the art. Typically, some type of a damping device is placed between two objects to attenuate the force and displacement between the two objects. These type of isolators are useful in many applications and are particularly useful to protect sensitive equipment on board ships or the like. Generally, it is preferred to have a shock isolator that isolates from shocks in all directions, that is a six degree of freedom shock isolator that responds to shock in the x, y, and z axis.

When elastomers placed in a compressive condition they are generally not effective in damping or attenuating a shock force However, if the elastomer is place in a shear condition the elastomer is generally more responsive to damping the shock forces. The difficulty in using a single solid or massive elastomer as a shock damping device is that it is difficult to have the single elastomer simultaneously function as both a support and a damping device in all three major axis.

The present invention utilizes a single elastomer to provides a low cost shock isolator that simultaneously supports sensitive equipment and attenuate shocks in all three major axis to protect the sensitive equipment supported by the shock isolator. That is, the elastomer is configured so as to provide six degrees of freedom by cantileverly supporting a connector within housing so that regardless of the direction of the displacement of the connector it always places the elastomer in a substantial shear condition where the elastomer is most effective in damping the shock forces to the supported equipment.

SUMMARY OF THE INVENTION

Briefly, the present invention comprises a shock isolator having a cylindrical housing securable to a support structure with the cylindrical housing containing a bell shaped elastomer having a base secured to the cylindrical housing and an axially offset apex surface cantileverly secured to a connector that supports equipment to be isolated form shock with the cantileverly support of the apex surface from the base insuring that any displacement of the connector produces a substantial shearing action in the elastomer to generate effective damping of any shocks or vibrations to the system.

DESCRIPTION OF THE PREFERRED EMBODIMENT

Figure 1:
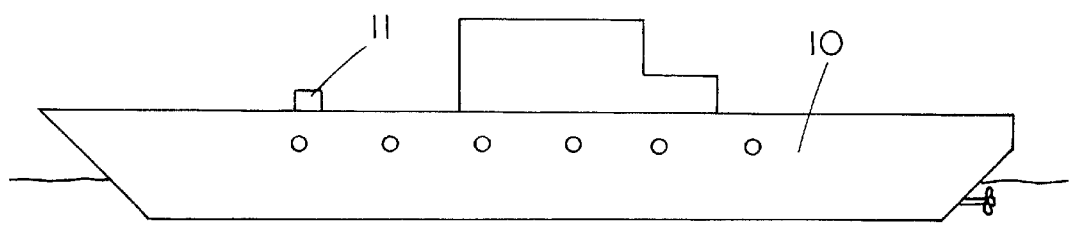
FIG. 1 shows a side view of ship having shock isolators to support control equipment therein.

FIG. 1 Shows a typical use of the present invention in a ship 10. Ship 10 is shown in side view and having a support structure 11 therein with shock isolators located in the support structure 11 to dampingly support sensitive control equipment located thereon.

Figure 2:
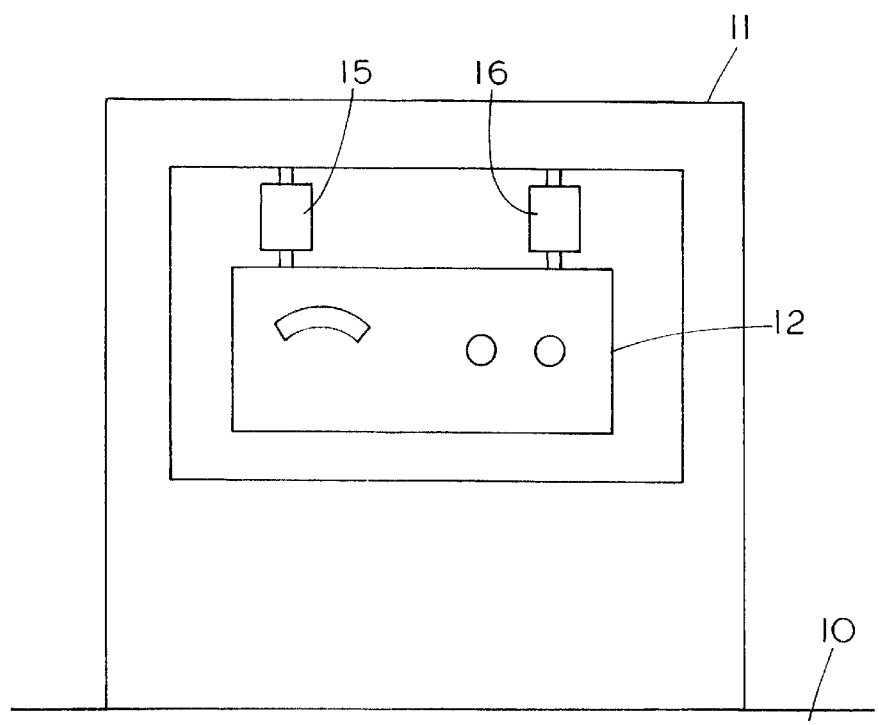
FIG. 2 shows a front view of a support structure holding equipment in a condition isolated from shock in three different axis.

FIG. 2 shows a front view of a support structure 11 which is supporting sensitive equipment 12 in a condition which isolates equipment 12 from shock n three different axis. A first six degree-of-freedom shock isolator 15 and a second six degree-of-freedom shock isolator 16 are located in a spaced position above equipment 12 and support equipment 12 in structure 11. Shock isolator 15 and 16 each have one end fixedly secured to structure 11 and the opposite end secured to equipment 12 to suspend the equipment 12 in a spaced condition from structure 11. The shock isolators 115 and 16 greatly attenuated any shocks to the structure 11 to thereby reduce the chances of the equipment 12 being damaged.

Figure 3:
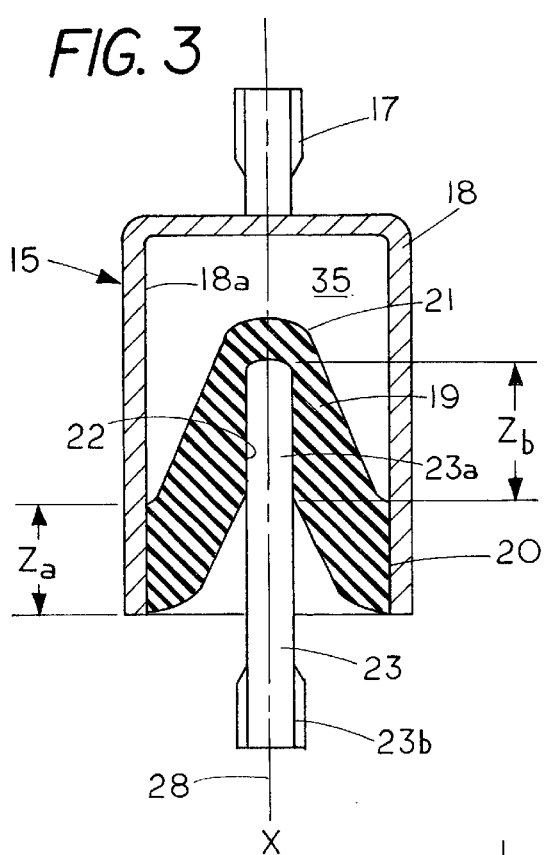
FIG. 3 shows a cross sectional view of the shock isolator of the present invention.
Figure 4:
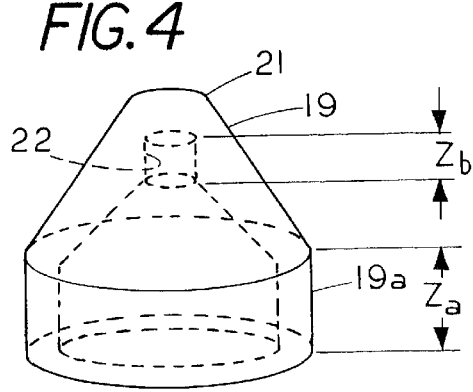
FIG. 4 show a perspective view of the bell shaped etastomer in the shock isolator shown in FIG. 3.

FIG. 3 shows a cross sectional view of shock isolator 15 of the present invention. Shock isolator 15 includes a member 17 for fixedly securing a cup-shaped, cylindrical shaped, rigid housing 18 to support structure 11. Preferably housing 18 is made of metal or the like and maintains its rigid condition. Located within the cylindrical housing 18 is a bell shaped elastomer 19. Bell shaped elastomer 19 has an annular base 20 that is preferably adhesively secured to an inner surface 18a of housing 18. The width of the zone or band of adhesive securement of the elastomer to the housing 18 is identified as $Z_a$. Bell shaped elastomer 19 also include an apex region 21 having an internal 360 degree apex support surface 22 which is preferably adhesively secured to a first end 23a of a rigid connector 23 to enable the elastomer to form a contilevered connection between housing 18 and connector 23. Connector 23 is located internally to bell shape elastomer 19. Connector 23 includes a second end 23b to support equipment therefrom. The width of the band or the zone of attachment of the apex support surface 22 to the end 23a of connector 23 is identified by $Z_b$. A central axis x extends vertically upward and is identified by reference numeral 28. the zone of attachment $Z_a$ and the zone of attachment $Z_b$ are axially offset from on another along axis 28 so as not to compressively surround connector 23a and thereby compressively limit the displacement of connector 23.

FIG. 3 shows isolator 15 in the relaxed condition with the connector in a central position in elastomer 19. In the embodiment shown, the connector 23 is sufficiently stiff to supporting equipment from connector end 23b. It is noted that the zones of adhesion $Z_b$ and $Z_a$ are axially offset from one another so that displacement of connector 22 with respect to housing 18 places elastomer 19 in shear. That is, in the embodiment shown in FIG. 3 the elastomer housing 18 provides 360 degree contilevered support between the housing 18 and connector end 23a. By providing a 360 degree cantilever support the elastomer can be responsive to shocks in any directions by elongation rather than compression of the elastomer.

FIG. 3 shows that housing 18 and the elastomer 23 from a closed chamber 35 that prevents external objects from inhibiting displacement of elastomer 19. That is, normally housing 18 is suspended along a vertical axis 28 with the housing 18 preventing object from accidentally falling into the chamber 35 from the top and elastomer 19 preventing objects from accidentally entering chamber 35 from the bottom. As the bottom of elastomer 19 faces downward objects can not normally be retained therein. Consequently, when isolator 15 is placed in the vertical condition the isolator will remain operable and unaffected by any objects that might accidentally come into contact with isolator 15.

Figure 5:
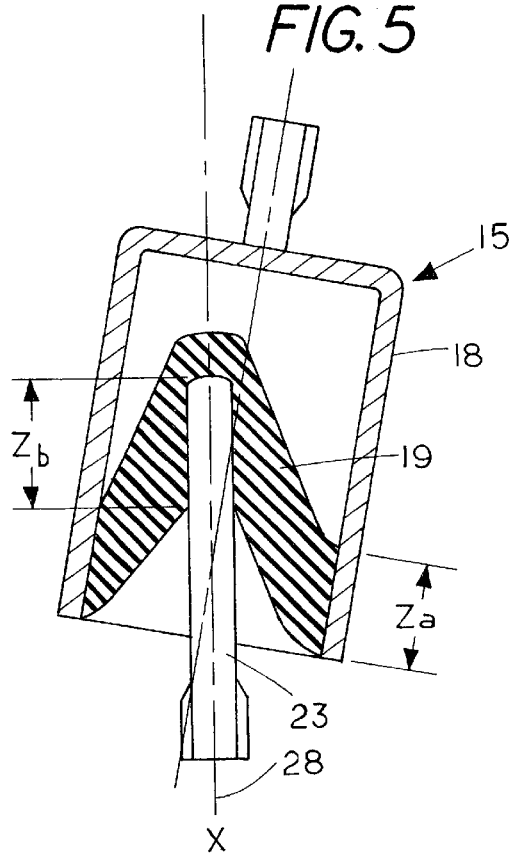
FIG. 5 illustrates the dynamic response of the bell shaped elastomer.

In order to appreciate the operation of the invention reference should be made to FIG. 5 which shows shock isolator 15 with housing 18 angularly displaced with respect to vertical axis 28. Note, the only connection between connector 23 and housing 18 is through elastomer 19. Furthermore, the forces between connector 23 and housing 18 are transmitted through the two zones of attachment $Z_a$ and $A_b$. The result is that the elastomer 19 is placed in a substantial shear condition so as to be responsive to shocks to the system. By substantial shear condition it is meant that while there may be some compressive action occurring within elastomer 19 the compressive action is minimized so that the shear or tension response of the elastomer predominates. While the connector is shown being angularly displaced form the x-axis it is apparent that 260 degree contilever support provided by the bell shaped elastomer 19 places the elastomer in a substantial shear condition to effectively damp shocks from any direction. By having the two zones of attachment $A_a$ and $A_b$ axially offset from one another one assures that displacement of the connector 23 with respect to the housing 18 places the elastomer 23 in a shear condition or substantial shear condition that effectively dissipates or attenuates shocks between objects connected thereto in the three major axis.

While angular displacement of connector 22 places elastomer 19 in the shear condition any axially displacement of connector 22 along x-axis 28 also places elastomer 19 in a substantial shear or tension condition. Consequently, while connector 22 is free to move in any direction it is tensionally restrained from moving by the contilever support between connector 22 and housing 18. However, since motion in any direction produces a substantial shear condition the bell shaped elastomer provides effective damping between two objects.

We claim:

1. A six degree of freedom shock isolator comprising:
    a housing, said housing securable to a support structure;
    an elastomeric material, said elastomeric material located within said housing, said elastomeric material having a general bell shape, said elastomeric material having an apex region with an internal apex support surface located therein and an annular base axially offset from said internal apex support surface, said annular base secured to said housing; and
    a connector, said connector located internally to said bell shape elastomeric material, said connector having a first end for supporting an object to be isolated from a shock, said connector having a second end, said second end secured to said internal apex support surface so that displacement of said connector in any direction produces a substantial shearing action in said elastomeric material to thereby dampen the shock to the connector.

2. The six degree of freedom shock isolator of claim 1 wherein the annular base is secured to an interior surface of said housing.

3. The six degree of freedom shock isolator of claim 2 wherein the annular base is adhesively secured to the interior surface of said housing.

4. The six degree of freedom shock isolator of claim 1 wherein the internal apex support surface is adhesively secured to the second end of said connector to prevent the displacement of the second end of said connector from the internal apex support surface.

5. The six degree of freedom shock isolator of claim 1 wherein the elastomeric material is rubber.

6. The six degree of freedom shock isolator of claim 1 wherein the entire internal apex support surface is axially offset from the annular base surface.

7. The six degree of freedom shock isolator of claim 1 including a ship with said support structure secured to said ship.

8. The six degree of freedom shock isolator of claim 1 wherein the connector is centrally positioned within said bell shaped elastomeric material.

9. The six degree of freedom shock isolator of claim 1 wherein the housing is a metal cylindrical housing and said connector is cylindrical metal rod.

10. The six degree of freedom shock isolator of claim 1 wherein the elastomeric material provides a 360 degree cantilever support between said housing and said connector.

11. The six degree of freedom shock isolator of claim 1 wherein the housing and the elastomeric material form a closed chamber to prevent external objects inhibiting displacement of said elastomeric material in response to a shock transmitted thereto.

12. A system for limiting shock transmission comprising:
    a ship, said ship having a support structure;
    a control cabinet;
    a six degree of freedom shock isolator, said six degree of freedom isolator having a housing, said housing cantileverly secured to said support structure;
    an elastomeric material positioned within said housing, said elastomeric having an apex support surface and an annular base axially offset from said apex support surface, said annular base secured to an interior surface of said housing over a 360 degree area; and
    a connector, said connector having a first end for supporting the control cabinet, said connector having a second end, said second end secured to said apex support surface over a 360 degree area to provide 360 degree cantilever support to said connector so that displacement of said support structure in any direction produces a substantial shearing action in said elastomeric material to thereby dampen a shock to the system.

13. The six degree of freedom shock isolator of claim 12 wherein the annular base is adhesively secured to the interior surface of said housing.

14. The six degree of freedom shock isolator of claim 12 wherein the apex support surface is adhesively secured to the second end of said connector.

15. The six degree of freedom shock isolator of claim 12 wherein the elastomer is rubber.

16. The six degree of freedom shock isolator of claim 12 wherein the connector is centrally positioned within said bell shaped elastomer.

17. The six degree of freedom shock isolator of claim 12 wherein the housing is a metal cylindrical housing and said connector is cylindrical metal rod.

18. A shock isolating system comprising:

a housing, said housing cantileverly securable to a support structure;

a one-piece elastomeric material, said one-piece elastomeric material positioned entirely within said housing when in an uncompressed state, said one-piece elastomeric material having a general bell shape with an enclosed apex region, said elastomeric material having an internal apex support surface and an annular base axially offset from said internal apex support surface, said annular base adhesively secured to said housing; and a connector, said connector having a first end for supporting an object to be isolated from a shock, said connector having a second end adhesively secured to said connector from said internal apex support surface so that displacement of said connector in any direction produces a substantial shearing action in said on-piece elastomeric material to thereby dampen the shock to the shock isolating system.

* * * * *